(12) United States Patent
Rivera (10) Patent No.: US 9,179,797 B2
(45) Date of Patent: Nov. 10, 2015

(54) DISPOSABLE SINGLE SERVING BEVERAGE POD ADAPTER

(76) Inventor: Adrian Rivera, Whittier, CA (US)

( * ) Notice: Subject to any disclaimer, the term of this patent is extended or adjusted under 35 U.S.C. 154(b) by 1082 days.

(21) Appl. No.: 13/117,528

(22) Filed: May 27, 2011

(65) Prior Publication Data

US 2011/0274802 A1    Nov. 10, 2011

Related U.S. Application Data (63) Continuation-in-part of application No. 11/777,831, filed on Jul. 13, 2007, now Pat. No. 8,720,320, and a continuation-in-part of application No. 12/610,181, filed on Oct. 30, 2009, now Pat. No. 8,621,981, and a continuation-in-part of application No. 12/620,584, filed on Nov. 17, 2009, now Pat. No. 8,291,812, and a continuation-in-part of application No. 12/762,262, filed on Apr. 16, 2010, and a continuation-in-part of application No. 12/960,496, filed on Dec. 4, 2010.

(51) Int. Cl.
| | |
|---|---|
| *A47J 31/06* | (2006.01) |
| *A23F 5/26* | (2006.01) |
| *B65D 85/804* | (2006.01) |
| *B65B 29/02* | (2006.01) |

(52) U.S. Cl.
CPC .......... *A47J 31/0689* (2013.01); *A47J 31/0668* (2013.01); *B65D 85/8043* (2013.01); *B65B 29/02* (2013.01)

(58) Field of Classification Search
CPC ... A47J 31/0689; A47J 31/02; A47J 31/0668; A47J 31/047; B65B 29/02; B65D 85/8043
USPC ............ 99/286–287, 289 R, 295, 298, 302 R, 99/485, 323; 426/77–82, 394, 433, 477
See application file for complete search history.

(56) References Cited

U.S. PATENT DOCUMENTS

| | | |
|---|---|---|
| 2,433,815 A | 12/1947 | Laforge |
| 3,022,411 A | 2/1962 | Soper et al. |
| 3,115,822 A | 12/1963 | Totten |
| 3,120,170 A | 2/1964 | Garte |
| 3,136,241 A | 6/1964 | Price |
| 3,199,682 A | 8/1965 | Scholtz |
| 3,224,360 A | 12/1965 | Wickenberg et al. |
| 3,316,388 A | 4/1967 | Wickenbert et al. |
| 3,384,004 A | 5/1968 | Perlman et al. |
| 3,405,630 A | 10/1968 | Weber, III |
| 3,583,308 A | 6/1971 | Williams |

(Continued)

FOREIGN PATENT DOCUMENTS

WO    WO 2005/092160 A1    10/2005

*Primary Examiner* — Dana Ross
*Assistant Examiner* — James Sims, III
(74) *Attorney, Agent, or Firm* — Kenneth L. Green; Averill & Green (57) ABSTRACT

A disposable pod adaptor assembly for use in a single serve beverage brewer. The assembly is designed for use in brewers configured for cup-shaped beverage extract cartridges. The assembly includes a receptacle and a cover configured to engage with the receptacle. The receptacle includes a raised portion in it's interior, which raised portion is adapted to push a beverage pod residing inside the receptacle upward against the cover to create a tamping effect. In some implementations, the receptacle and raised portion are molded as a single piece to provide a low cost disposable pod adapter.

13 Claims, 11 Drawing Sheets (56) References Cited

U.S. PATENT DOCUMENTS

| | | | |
|---|---|---|---|
| 3,607,297 A | 9/1971 | Fasano | |
| 3,757,670 A | 9/1973 | Laama et al. | |
| 3,844,206 A | 10/1974 | Weber | |
| 3,958,502 A | 5/1976 | Vitous | |
| 4,253,385 A | 3/1981 | Illy | |
| 4,286,515 A | 9/1981 | Baumann et al. | |
| 4,603,621 A | 8/1986 | Roberts | |
| 4,703,687 A | 11/1987 | Wei | |
| 4,800,089 A | 1/1989 | Scott | |
| 4,998,463 A | 3/1991 | Precht et al. | |
| 5,000,082 A | 3/1991 | Lassota | |
| 5,012,629 A | 5/1991 | Rehman | |
| 5,046,409 A | 9/1991 | Henn | |
| 5,123,335 A | 6/1992 | Aselu | |
| 5,171,457 A | 12/1992 | Acuff et al. | |
| 5,233,914 A | 8/1993 | English | |
| 5,325,765 A | 7/1994 | Sylvan et al. | |
| 5,335,589 A | 8/1994 | Yerves et al. | |
| 5,526,733 A | 6/1996 | Klawuhn et al. | |
| 5,582,730 A | 12/1996 | Hugentobler | |
| 5,636,563 A | 6/1997 | Oppermann et al. | |
| 5,649,412 A | 7/1997 | Binacchi | |
| 5,676,041 A | 10/1997 | Glucksman et al. | |
| 5,829,340 A | 11/1998 | Yang | |
| 5,840,189 A * | 11/1998 | Sylvan et al. | 210/474 |
| 5,870,943 A | 2/1999 | Levi et al. | |
| 5,895,672 A | 4/1999 | Cooper | |
| 6,136,352 A | 10/2000 | Silverstein et al. | |
| 6,189,438 B1 | 2/2001 | Bielfeldt et al. | |
| D454,433 S | 3/2002 | Peter | |
| D454,434 S | 3/2002 | McDaniel et al. | |
| 6,440,256 B1 | 8/2002 | Gordon et al. | |
| D474,110 S | 5/2003 | Sweeney | |
| D474,111 S | 5/2003 | Lazaris | |
| 6,589,577 B2 | 7/2003 | Lazaris et al. | |
| 6,606,938 B2 | 8/2003 | Taylor | |
| 6,607,762 B2 | 8/2003 | Lazaris et al. | |
| 6,645,537 B2 * | 11/2003 | Sweeney et al. | 426/79 |
| 6,655,260 B2 | 12/2003 | Lazaris et al. | |
| 6,658,989 B2 | 12/2003 | Sweeney et al. | |
| 6,708,600 B2 | 3/2004 | Winkler et al. | |
| 6,727,484 B2 | 4/2004 | Pollcappelli | |
| 6,740,345 B2 | 5/2004 | Cai | |
| 6,748,850 B1 | 6/2004 | Kraan | |
| 6,777,007 B2 | 8/2004 | Cai | |
| 6,832,542 B2 | 12/2004 | Hu et al. | |
| 6,843,165 B2 | 1/2005 | Stoner et al. | |
| D502,362 S | 3/2005 | Lazaris et al. | |
| 6,904,840 B1 | 6/2005 | Pfeifer et al. | |
| 6,948,420 B2 | 9/2005 | Kirschner et al. | |
| 7,047,870 B2 | 5/2006 | Gantt et al. | |
| 7,081,263 B2 | 7/2006 | Albrecht | |
| 7,131,369 B2 | 11/2006 | Gantt et al. | |
| 7,320,274 B2 | 1/2008 | Castellani | |
| 7,377,089 B2 | 5/2008 | Rapparini | |
| 7,946,217 B2 | 5/2011 | Favre et al. | |
| 8,047,127 B2 | 11/2011 | Lin | |
| 2002/0035929 A1 | 3/2002 | Kanba et al. | |
| 2002/0148356 A1 | 10/2002 | Lazaris et al. | |
| 2003/0200872 A1 | 10/2003 | Lin | |
| 2004/0005384 A1 | 1/2004 | Cai | |
| 2004/0118290 A1 | 6/2004 | Cai | |
| 2005/0236323 A1 | 10/2005 | Oliver et al. | |
| 2005/0257695 A1 | 11/2005 | Dobranski et al. | |
| 2006/0159815 A1 | 7/2006 | Crook et al. | |
| 2006/0174769 A1 | 8/2006 | Favre et al. | |
| 2006/0196364 A1* | 9/2006 | Kirschner | 99/295 |
| 2007/0259074 A1* | 11/2007 | Searchilli et al. | 426/78 |
| 2009/0229471 A1 | 9/2009 | Lun et al. | |
| 2010/0083843 A1 | 4/2010 | Denisart et al. | |
| 2011/0209623 A1 | 9/2011 | Leung et al. | |
| 2011/0274802 A1 | 11/2011 | Rivera | |
| 2012/0207895 A1 | 8/2012 | Rivera | |
| 2012/0207896 A1 | 8/2012 | Rivera | |
| 2012/0276264 A1 | 11/2012 | Rivera | |
| 2012/0285330 A1 | 11/2012 | DeMiglio et al. | |
| 2012/0285334 A1 | 11/2012 | DeMiglio et al. | |
| 2014/0245895 A1 | 9/2014 | DeMiglio et al. | |

* cited by examiner

DISPOSABLE SINGLE SERVING BEVERAGE POD ADAPTER

The present application is a Continuation In Part of:
U.S. patent application Ser. No. 11/777,831 filed Jul. 13, 2007 and now issued as U.S. Pat No. 8,720,320; and
U.S. patent application Ser. No. 12/610,181 filed Oct. 30, 2009 and now issued as U.S. Pat. No. 8,621,981; and
U.S. patent application Ser. No. 12/620,584 filed Nov. 17, 2009 and now issued as U.S. Pat. No. 8,291,812; and
U.S. patent application Ser. No. 12/762,262 filed Apr. 16, 2010, and
U.S. patent application Ser. No. 12/960,496 filed Dec. 4, 2010, which applications are incorporated in their entirety herein by reference.

BACKGROUND OF THE INVENTION

The present invention relates to accessories for single serving beverage brewers, and in particular to a disposable pod adaptor for a single serving beverage pods.

Various types of single serve beverage brewers have been developed in recent years. These machines are generally designed with brewing chambers adapted to receive a small amount of ground coffee or other beverage extract. Once the beverage is placed in the brewing chamber, the machine injects hot water into the beverage to produce a single serving of freshly brewed beverage. Some machines have brewing chambers configured to receive pods which are small, flattened disk-shaped filter packages of beverage extract, while other machines are configured to accommodate larger, cup-shaped beverage cartridge.

One particular type of single serve beverage brewers designed to accommodate the cup-shaped beverage filter cartridge is manufactured and sold by Keurig Inc. of Wakefield, Mass. The Keurig beverage brewer has a brewing chamber dimensioned to receive cup-shaped cartridges such as those sold under the trademark K-Cup. These cartridges are configured in the form of a container having a cone-shaped permeable filter packet containing a dry beverage medium such as ground coffee, which is disposed in the interior of the container. The machine also has upper and lower puncture needles. In operation, the upper needle punctures the top cover of the cartridge and injects pressurized water through the opening onto the beverage medium while the lower needle punctures the bottom of the cartridge to create an outlet for outflow of the brewed beverage. Additional detailed descriptions of this type of machine and cartridge are disclosed in U.S. Pat. Nos. 5,325,765, 5,840,189 and 6,606,938, which are incorporated in their entirety herein by reference.

The configuration of the brewing chamber of the above described single serve beverage brewer inherently limits the use of the machine to cup-shaped cartridges. As a result, users of the Keurig machine or similar brewers designed for cup-shaped cartridges, would have to purchase a different machine to brew beverage known pods, which are typically somewhat flattened disc shaped filter paper packets containing coffee. The use of multiple machines can be costly, inconvenient and cause inefficient use of counter space. Thus, there is a need for an apparatus and method for modifying single serve beverage brewers configured for cup-shaped cartridges so that they can also be used to brew beverages from pods.

Additionally, conventional automated pod brewers typically include a brewing chamber adapted to receive an individual pod. During the brewing process, hot water is injected into the brewing chamber across the surface of the pod while brewed beverage is directed to flow out of an outlet into a cup. Some coffee connoisseurs believe that coffee brewed using pod brewers do not have as good flavor extraction as coffee brewed by baristas who usually tamp or compact the coffee prior to brewing. Thus, there is a need for an improved pod brewing system.

Further, there is a need for a very low cost disposable pod brewing system which may be included with prepackaged pods.

BRIEF SUMMARY OF THE INVENTION

The present invention addresses the above and other needs by providing a disposable pod adaptor assembly for use in a single serve beverage brewer. The assembly is designed for use in brewers configured for cup-shaped beverage extract cartridges. The assembly includes a receptacle and a cover configured to engage with the receptacle. The receptacle includes a raised portion in it's interior, which raised portion is adapted to push a beverage pod residing inside the receptacle upward against the cover to create a tamping effect. In some implementations, the receptacle and raised portion are molded as a single piece to provide a low cost disposable pod adapter.

The preferred embodiments of the present invention have several features, no single one of which is solely responsible for their desirable attributes. Without limiting the scope of this invention, its more prominent features will now be discussed briefly. However, not all of the following features are necessary to achieve the advantages of the device. Therefore, none of the following features should be viewed as limiting. After considering this discussion, and particularly after reading the section entitled "Detailed Description of the Preferred Embodiments," one will understand how the features of the preferred embodiments provide advantages over prior art devices.

In one embodiment, the present invention provides a pod adaptor assembly for use in combination with a single serve beverage brewer designed with upper and lower puncturing devices for piercing cup-shaped cartridges. The pod adaptor assembly comprises a receptacle and a cover adapted to sealingly engage with the receptacle. The receptacle preferably comprises a base having an interior surface and an exterior surface. A raised portion is formed on the interior surface of the base, wherein the raised portion is adapted to provide a support surface for a pod. Preferably, the base of the receptacle is also adapted to receive an upwardly extending puncture needle from the brewer in a manner such that the needle extends through the base and does not puncture the pod. In one implementation, the receptacle further comprises protrusions formed on the interior surface of the base. In another implementation, the protrusions comprise ribs arranged in a spaced apart manner across the interior surface. In certain preferred implementations, the assembly further comprises a biasing mechanism adapted to press the pod against the cover when the cover is sealingly engaged with the receptacle, thereby compacting the beverage extract and creating a tamping effect.

In another embodiment, the present invention provides a pod adaptor assembly which comprises a receptacle having an interior region adapted to receive a beverage pod. The receptacle further includes a raised support disposed in the interior region and adapted for supporting a pod. Preferably, the raised support is spring biased. The assembly further includes a lid adapted to sealingly engage with the receptacle. In one implementation, the interior region of the receptacle further comprises a passageway adapted for receiving a puncture needle extending upwardly through the lower exterior surface. In another implementation, the raised support surface is spring biased.

In yet another embodiment, the present invention provides a pod adaptor assembly comprising a receptacle having a spring biased support surface for a pod and a cover adapted to sealingly engage with the receptacle. In one implementation, the assembly further includes an inlet port adapted for introducing pressurized hot water into the receptacle and an outlet port adapted for permitting brewed beverage to flow out of the receptacle. In certain preferred implementations, the inlet port comprises an opening formed in the cover and the outlet port comprises an opening formed in the receptacle.

In yet another embodiment, the present invention provides brewing chamber for a beverage pod. The chamber comprises a receptacle adapted to receive the beverage pod, wherein the receptacle has a base and a plurality of sidewalls extending upwardly from the base. The chamber further comprises a cover adapted to sealingly engage with the receptacle and a biasing device, wherein the biasing device is adapted to press the beverage pod against at least a portion of the cover when the cover is sealingly engaged with the receptacle. In one implementation, the brewing chamber further comprises an inlet port, wherein the inlet port is adapted to introduce hot water into the receptacle. In another implementation, the biasing device comprises a spring. Preferably, the biasing device is adapted to accommodate and exert pressure against pods of different configurations and sizes. The biasing device also preferably applies a pressure against the beverage pod in a manner such that the pressure compacts the beverage extract inside the pod.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

The pod adaptor assembly of one preferred embodiment of the present invention is designed to be used in combination with a single serve beverage brewer having a brewing chamber configured to receive a cup-shaped filter cartridge such as those sold under the trademark K-Cup. Additional descriptions of certain embodiments of the brewer are disclosed in U.S. Pat. Nos. 6,708,600 and 7,165,588, which are hereby incorporated by reference in their entireties.

Figure 1A:
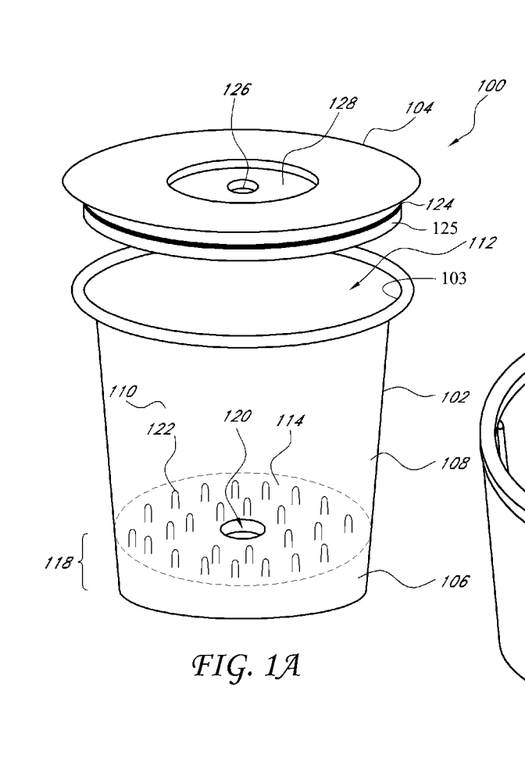
FIG. 1A shows a pod adaptor assembly of one preferred embodiment of the present invention.

FIG. 1A illustrates a pod adaptor assembly 100 of one embodiment of the present invention. As shown in FIG. 1A, the pod adaptor assembly 100 generally comprises a cup-shaped receptacle 102 and a cover 104 adapted to sealingly engage with the receptacle 102. The receptacle 102 has a substantially circular base 106 and sidewalls 108 extending upwardly from the base 106 to define a receptacle 110 having an upper opening 112. The base 106 has an interior surface 114 and an exterior surface 116, which are separated by a distance 118 so that the interior surface 114 is elevated above the exterior surface by the distance. In one embodiment, the distance 118 is between 1 and 20 mm. In another embodiment, the distance is about 10 mm. While the preferred embodiments of the pod assembly utilize a cup-shaped receptacle, the receptacle can assume other shapes and configurations such as square or cylindrical without departing from the spirit of the present invention.

As also shown in FIG. 1A, a passageway 120 is formed in the base 106 of the receptacle 102, extending between the interior and exterior surfaces 114, 116 of the base 106. The passageway 120 is configured to receive a needle-like structure that is typically mounted in the single serve beverage brewer to puncture the bottom of a disposable cup-shaped filter. The location of the passageway 120 relative to the base 106 is preferably selected to match the relative location of the needle-like structure in the brewer. In a preferred embodiment, the passageway 120 may be slightly off-center from the base to correspond to the location of the needle. In operation, the needle-like structure is designed to move upwardly toward the bottom of the base 104 of the receptacle a first distance so as to puncture the bottom of the cup-shaped filter. To prevent the needle-like structure from hitting against the base of the receptacle or piercing the beverage pod inside the receptacle, the passageway 120 allows the needle-like structure to move freely without jamming against the receptacle or the pod. The passageway 120 also serves the purpose of providing an outlet for brewed beverage to flow out of the receptacle into a drinking vessel. In one embodiment, the passageway 120 is substantially circular and has a diameter of the about 5 mm and a length of about 10 mm.

Figure 1B:
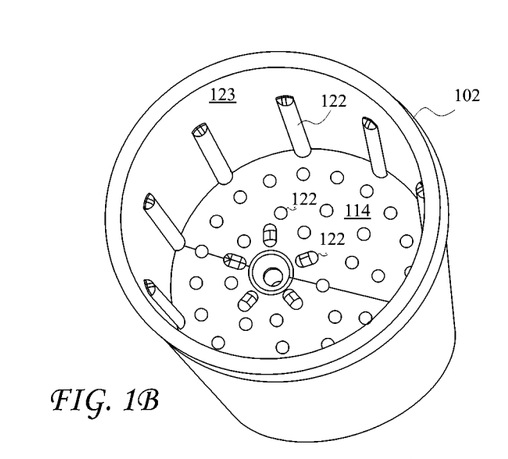
FIG. 1B shows an interior of a receptacle of one embodiment for the pod adaptor assembly of FIG. 1A.

As FIG. 1A further shows, a plurality of spaced apart protrusions 122 are formed across the interior surface 114 of the base. The protrusions 122 collectively provide a plurality of spaced apart raised surfaces for the pod to rest against. When the pod is placed inside the receptacle and resting against the protrusions, the gaps between the pod the interior surface 114 of the base allow brewed beverage to flow unobstructed from the pod down through the passageway 120. In one implementation, the protrusions can be configured in the manner shown in FIG. 1B. As shown in FIG. 1B, the protrusions 122 comprise a plurality of circular and oval shaped protrusions extending upwardly from the lower surface 114 of the receptacle 102. In some implementations, a plurality of ribs 122 are also arranged to extend outwardly from an interior side surface 123 of the receptacle 102.

As also shown in FIG. 1A, the cover 104 of the assembly 100 has a circular (or cylindrical) portion 125 and a seal (for example, an O-ring) 124 sized to sealingly engage the cover 104 to an inside surface 103 of the receptacle opening 112 in a manner known in the art, for example, an interference fit. The cover 104 has an opening 126 configured to accommodate a liquid inlet probe from the brewer. The liquid inlet probe is typically used to pierce the cup-shaped filter cartridge and introduce pressurized hot water into the cartridge. In certain embodiments, the cover 104 also has a circular recessed section 128 disposed concentrically around the opening 112. The circular recessed section 128 is adapted to mate with a correspondingly shaped circular protrusion formed on the single serve brewer.

Figure 1C:
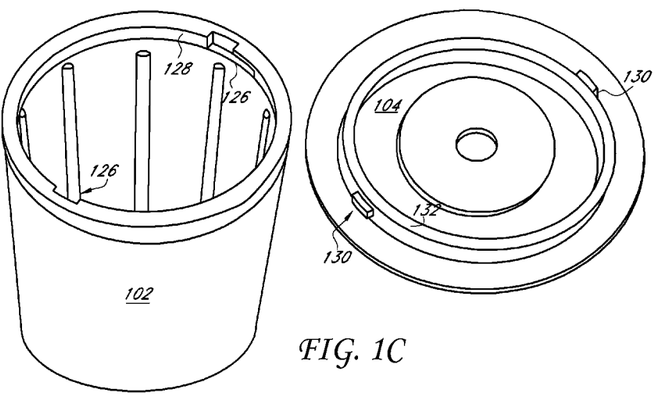
FIG. 1C shows a receptacle of yet another embodiment of the pod adaptor assembly of FIG. 1A, illustrating a locking mechanism for securing the cover over the receptacle.

In certain embodiments, the assembly 100 further includes a locking mechanism adapted to lock the cover in place relative to the receptacle. FIG. 1C illustrates one example of such locking mechanism. As shown in FIG. 1C, a plurality of notches 126 are formed in the interior rim of the receptacle. The notches 126 are configured to engage with mating protrusions 130 formed on an interior rim 132 of the cover 104. When the cover 104 is positioned over the opening of the receptacle 102, the protrusions 130 on the interior rim 132 of the cover preferably slidably engage with the notch so as to lock the cover in place. It will be appreciated that other locking mechanisms known in the art can also be used to lock the cover in place.

Figure 2:
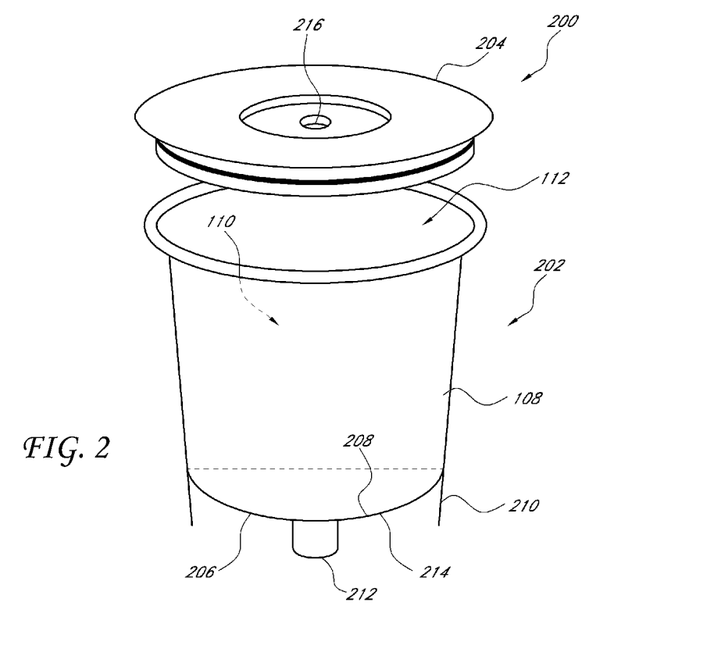
FIG. 2 shows a pod adaptor assembly of another preferred embodiment of the present invention.

FIG. 2 illustrates a pod adaptor assembly 200 of another embodiment of the present invention. The pod adaptor assembly 200 generally comprises a cup-shaped receptacle 202 adapted to receive a pod and a cover 204 adapted to sealingly engage with the receptacle 202. The receptacle 202 has a base 206 having a downwardly sloping interior surface 208 supported by a plurality of legs 210. A passageway 212 extends downwardly from the exterior surface 214 of the base. The passageway 212 is adapted to guide and allow the needle-like structure from the brewer to extend upwardly without hitting against the receptacle or piercing the pod inside the receptacle. The passageway 212 also permits outflow of the brewed beverage from the receptacle. In one embodiment, the passageway 212 has a diameter of about 5 mm and a length of about 1 mm to 20 mm. The location of the passageway 212 relative to the base 206 is preferably selected to correspond to the location of the upwardly moving needle in the brewer. In one embodiment, the passageway 212 is offset by about 1-5 mm from the center of the base. As also shown in FIG. 2, the cover 204 of the assembly 200 has an opening 216 formed therethrough, which is adapted to allow insertion of a liquid inlet probe from the brewer.

Figure 3A:
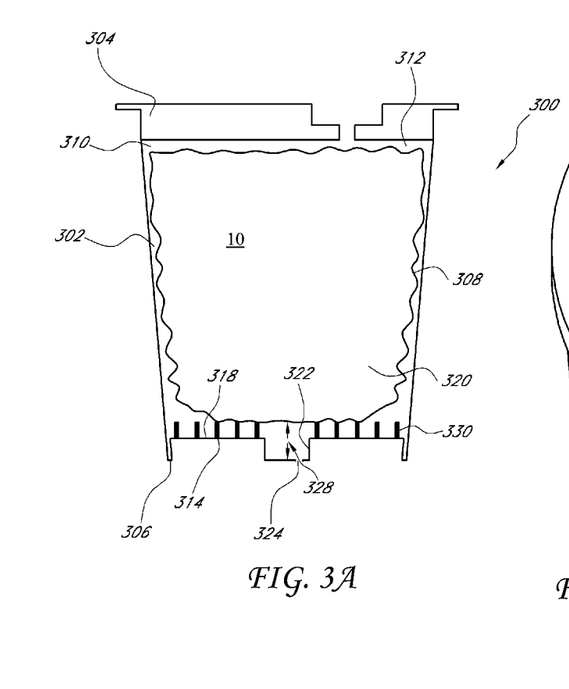
FIG. 3A is a cross-sectional view of a pod adaptor assembly of yet another preferred embodiment of the present invention.

FIG. 3A is a schematic illustration of a pod adaptor assembly 300 of another preferred embodiment of the present invention. The pod adaptor assembly 300 generally comprises a receptacle 302 and a cover 304 adapted to sealingly engage with the receptacle 302. The receptacle 302 has a substantially circular base 306 and sidewalls 308 extending upwardly from the base 306 defining a receptacle 310 having an upper opening 312. The base 306 has an annular raised portion 314 extending upwardly from a lower surface 316 of the base and an opening 324 formed in a portion of the base that is not raised. The raised portion 314 provides a raised support surface 318 for a pod 10 so that the pod 10 does not contact and possibly block the opening 324 for brewed beverage to flow through. Preferably, the lower surface of the pod 10 is also elevated from the opening 324 by a distance 328 which is calculated to accommodate the upward extension of the puncture needle in the brewer during operation. In one embodiment, the distance 328 is between about 5 to 20 mm. In certain preferred embodiments, a plurality of spaced apart protrusions 330 are formed on the raised support surface 318. The gaps between the protrusions facilitate flow of brewed beverage from the pod 10 toward the opening 324.

Figure 3B:
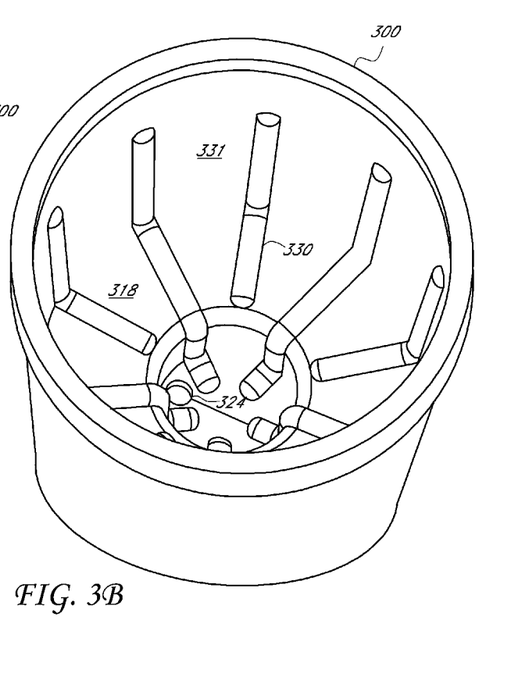
FIG. 3B shows an interior of a receptacle of one embodiment for the pod adaptor assembly of FIG. 3A.

FIG. 3B illustrates protrusions 330 of one implementation for the receptacle 300 of FIG. 3A. As shown in FIG. 3B, the protrusions 330 comprise a plurality of spaced apart ribs disposed on an interior side wall 331 and both the raised and non-raised interior surface portions 318. As also shown in FIG. 3B, the opening 324 is located at an offset from the center of the base of the receptacle. The location is configured to correspond to the location of the puncture needle when the assembly is placed in the brewing chamber of the brewer.

Figure 4:
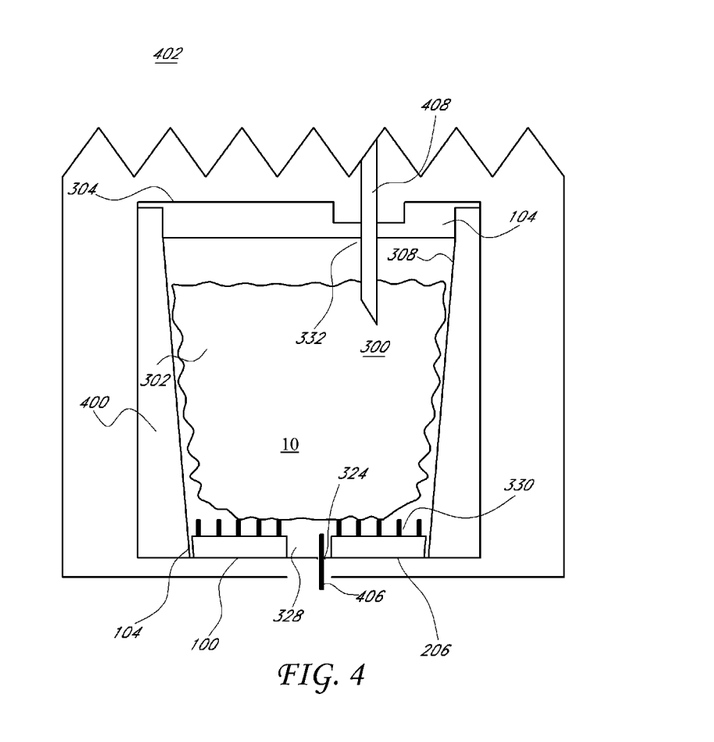
FIG. 4 is cross-sectional view of the pod adaptor assembly of FIG. 3 used in combination with a single serve beverage brewer having upper and lower puncturing devices.

FIG. 4 is a schematic illustration of the pod adaptor assembly of FIG. 3A used in conjunction with a single serve beverage brewer in brewing a beverage pod 10. As shown in FIG. 4, the pod adaptor assembly 300 is placed in a brewing chamber 400 of a single serve brewer 402 known in the art and configured for brewing cup-shaped filter cartridges. In one embodiment, the single serve brewer 402 is sold under the trademark Keurig. As also shown in FIG. 4, a beverage pod 10, preferably containing ground coffee, is positioned inside the receptacle 302 of the assembly 100. The pod 10 preferably fits snugly inside the receptacle 302 and rests against the protrusion 330. In operation, a lower puncture needle 406 of the brewer extends upwardly through the passageway 116 of the receptacle 102. As described above, the lower puncture needle 406 is designed to extend upwardly and puncture the bottom of a cup-shaped cartridge that is normally inside the brewing chamber. To adapt the brewer 402 for use in brewing beverage pods 10 which do not need to be punctured, the opening 324 in the base of the receptacle allows the puncture needle 406 to extend into the receptacle and the distance 328 between the opening 324 and the pod 10 is dimensioned such that the puncture needle 406 does not contact and pierce the pod 10. The distance advantageously provides an offset that accommodates the upward movement of lower puncture needle 406 without piercing the pod 10 or damaging the needle. As also shown in FIG. 4, a liquid inlet probe 408 is extended downwardly through an opening 332 formed in the cover 304 of the assembly 300. In some embodiments, the pod 10 is positioned such that the liquid inlet probe 408 punctures the pod 10. In other embodiments, the pod 10 is positioned such that the liquid inlet probe 408 does not puncture the pod 10.

Figure 5:
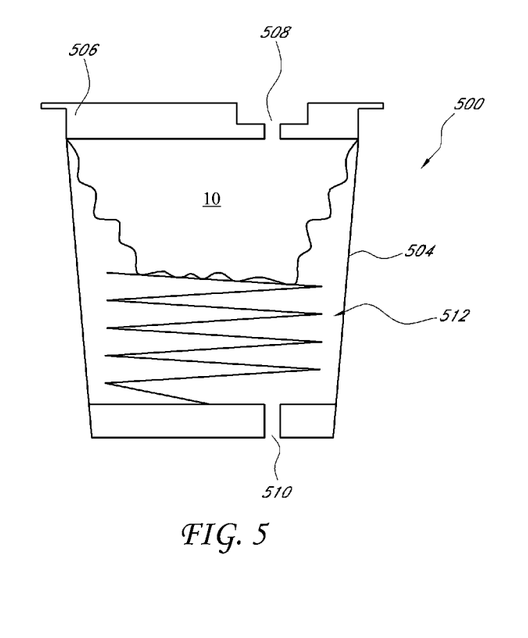
FIG. 5 is a cross-sectional view of a pod adaptor assembly of yet another preferred embodiment of the present invention.

FIG. 5 is a schematic illustration of yet another embodiment of the pod adaptor assembly 500 of the present invention showing a cross-section of the assembly when used with a beverage pod 10. The pod adaptor assembly 500 comprises a receptacle 504 and a cover 506 adapted to sealingly engage with the receptacle 504. The assembly 500 further includes a biasing mechanism 512 adapted to elevate and press the pod 10 against the cover 506 when the cover is sealingly engaged with the receptacle 504. In one implementation, the pressure applied against the pod 10 advantageously compacts the ground beverage in the pod 10 which has a similar effect as tamping the ground beverage. In certain preferred embodiments, the assembly has an inlet 508 for introducing pressurized hot water into the receptacle and an outlet 510 for allowing outflow of brewed beverage. In one implementation as shown in FIG. 5, the inlet 508 is an opening formed in the cover 506 that is also adapted to receive a liquid inlet probe, which is part of a single serve beverage brewers designed for cup-shaped cartridges. Also in the implementation shown in FIG. 5, the outlet 510 comprises an opening formed in the base of the receptacle to allow for outflow of brewed beverage from the receptacle as well as unobstructed upward extension of a puncture needle that is part of certain single serve beverage brewers designed for cup-shaped cartridges. By pressing the pod 10 up against the cover, the pod 10 is also pressed up against the inlet 508 through which hot water flows into the chamber. This advantageously "traps" the hot water in the pod 10 for a longer period of time and produces a stronger and more consistent brewed beverage. In addition to being an adaptor assembly for cup-shaped brewers, the receptacle having a biasing device as shown in FIG. 5 can also serve as a brewing chamber for pod brewers.

In one embodiment, the biasing mechanism 512 is a spring positioned inside the receptacle and extending upwardly from the base. The flexibility of spring is advantageous because it provides an adjustable support surface that can accommodate and apply pressure against pods 10 of a variety of different sizes. In cases of thicker or larger pods, the spring can be simply compressed more to accommodate the pods 10. The spring can push the pods of different thicknesses and sizes up against the hot water being introduced into the receptacle. It will also be appreciated that a variety of different biasing mechanisms can also be used to press the pod 10 against the inlet hot water. For example, the biasing mechanism can be a spring attached to the interior of the cover. As described above, pushing the pod 10 against the hot water inlet compacts the ground beverage and also causes much less water to escape from the pod 10 during the brewing pod. As a result, a much stronger and consistent cup of brewed beverage is produced.

Figure 6:
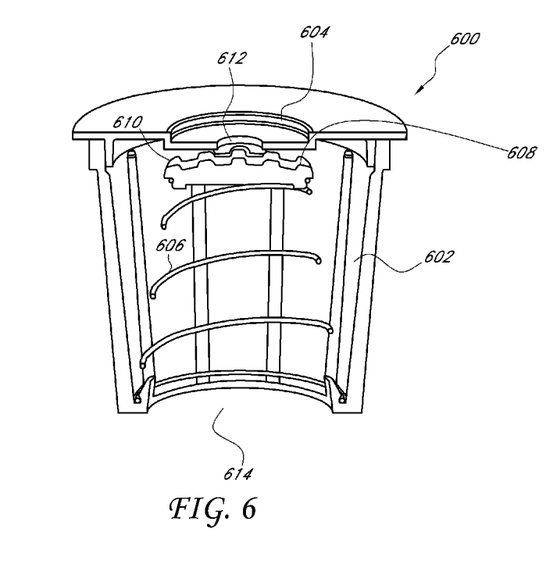
FIG. 6 is a cross-sectional view of a cross-sectional view of a pod brewing chamber of one preferred embodiment of the present invention.

FIG. 6 is a cross-sectional view of a pod brewing chamber 600 of one preferred embodiment of the present invention incorporating the novel biasing mechanism. The pod brewing chamber 600 can be used in conjunction with a variety of different conventional pod brewers such as those described in U.S. Pat. Nos. 6,904,840, 7,047,870 and 7,131,369, which are hereby incorporated by reference. The pod brewing chamber 600 comprises a cup-shaped receptacle 602 and a cover 604. Preferably, the receptacle 602 is sized to receive a circular beverage pod 10. In a preferred embodiment, the receptacle 602 has a height of about 44.5 mm, a lower diameter of about 35 mm and an upper diameter of about 45.5 mm. As also shown in FIG. 6, the brewing chamber 600 further includes a spring 606 extending upwardly from the bottom of the receptacle and a platform 608 attached to the upper end of the spring 606. In one implementation, the platform 608 comprises a circular support having ribs arranged in a spaced part configuration across the upper surface of the platform 608. In operation, a beverage pod 10 is inserted into the receptacle by being placed on the platform 608 and pressed downwardly until the pod 10 is inside the receptacle and the cover 604 can be placed over the opening of the receptacle. As also shown in FIG. 6, the cover 604 has an opening 612 through which hot water can be injected into the receptacle. The brewing chamber further includes a lower opening 614 for brewed beverage to flow out of the chamber.

Figure 7:
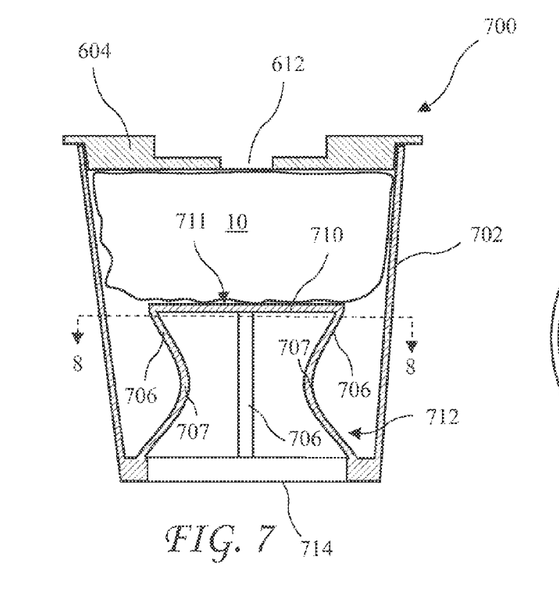
FIG. 7 is a cross-sectional view of a disposable pod adapter according to the present invention.
Figure 8:
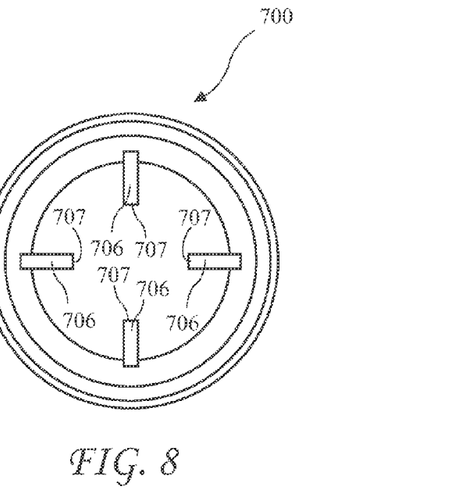
FIG. 8 is a cross-sectional view of the disposable pod adapter of FIG. 7 taken along line 8-8 of FIG. 7.

A cross-sectional view of a disposable pod adapter 700 according to the present invention is shown in FIG. 7 and a cross-sectional view of the disposable pod adapter 700 taken along line 8-8 of FIG. 7 is shown in FIG. 8. The disposable pod adapter 700 is similar to the pod adapter 600 but is an inexpensive throw-away pod adapter which may be included in retail packaging for pre-packaged brewing pods or pod packaging material for use by consumers to construct pods. Specifically, the disposable pod adapter 700 replaces the spring 606 with a platform 710 having a generally flat top surface 711 and flexible inward curved legs 706 molded as a single piece with the receptacle 702, thereby reducing cost. The legs 706 have knees 707 which flex inward when the platform 710 is pressed downward. When a pod 10 is captured between the cover 604 and the receptacle 702, the legs 706 bias the platform 710 and pod 10 upwards compacting brewing material in the pod 10 to provide more effective brewing of material in the pod 10. The disposable pod adapter 700 preferably includes four uniformly spaced inwardly curved legs 706. The disposable pod adapter 700 is preferably molded from plastic.

The cover 604 preferably engages the receptacle 702 to attach the cover 604 to the receptacle solely by features of the cover and receptacle as shown in FIGS. 1A and 1C. The cover 604 may or may not include the seal 124, and the cover 604 and the receptacle 702 may include a cooperating ring and groove to "snap" together, may be threaded to screw together, or may include any cooperating features to enable attachment solely using features of the cover and receptacle. For example a cylindrical portion 605 of the cover 604 may reside against a lip 703 of the receptacle 702 providing an interference fit of the cover 604 to the receptacle 702.

Figure 9:
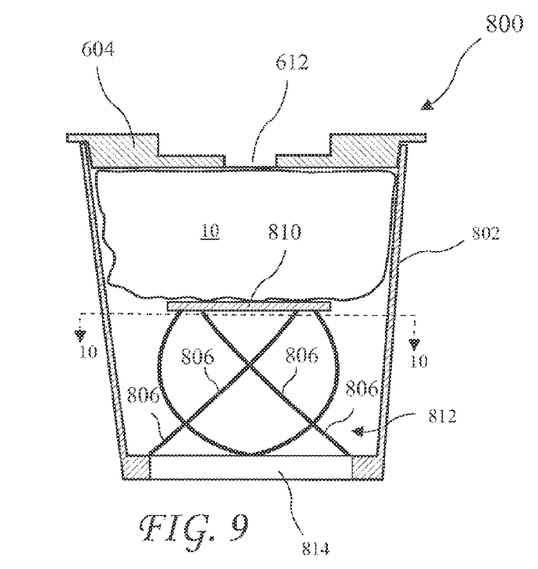
FIG. 9 is a cross-sectional view of a disposable pod adapter according to the present invention of another preferred embodiment of the present invention.
Figure 10:
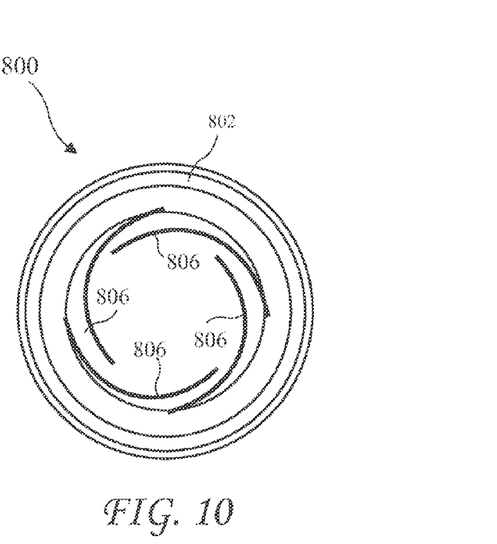
FIG. 10 is a cross-sectional view of the disposable pod adapter of FIG. 9 taken along line 10-10 of FIG. 9.

A cross-sectional view of a second embodiment of a disposable pod adapter 800 according to the present invention is shown in FIG. 9 and a cross-sectional view of the disposable pod adapter 800 taken along line 10-10 of FIG. 9 is shown in FIG. 10. The disposable pod adapter 800 includes flexible spiral legs 806 molded as a single piece with the receptacle 802, thereby reducing cost. The spiral legs 806 bias the platform 810 and pod 10 upwards compacting brewing material in the pod 10 to provide more effective brewing of material in the pod 10. The disposable pod adapter 800 preferably includes four uniformly spaced flexible spiral legs 806.

Figure 11:
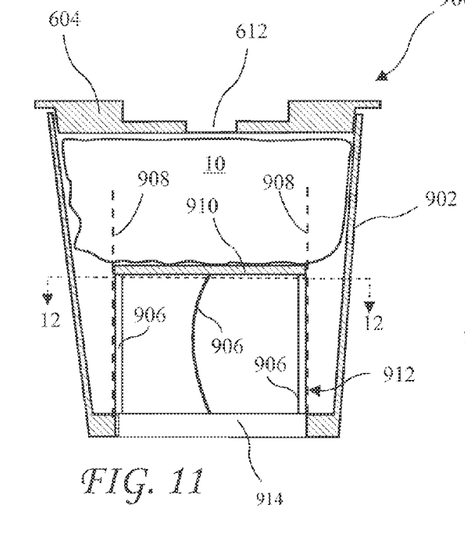
FIG. 11 is a cross-sectional view of a disposable pod adapter according to the present invention of another preferred embodiment of the present invention.
Figure 12:
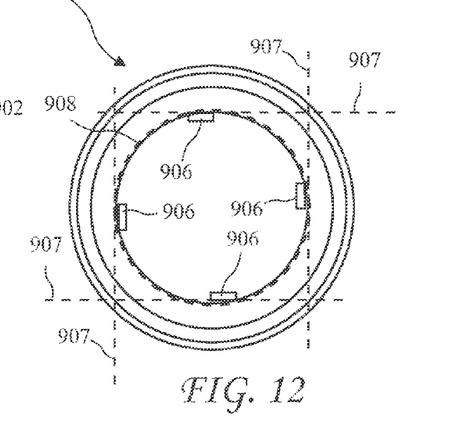
FIG. 12 is a cross-sectional view of the disposable pod adapter of FIG. 11 taken along line 12-12 of FIG. 11.

A cross-sectional view of another embodiment of a disposable pod adapter 900 according to the present invention is shown in FIG. 11 and a cross-sectional view of the disposable pod adapter of FIG. 11 taken along line 12-12 of FIG. 11 is shown in FIG. 12. The disposable pod adapter 900 is similar to the disposable pod adapter 700, except flexible bent legs 906 reaching up from the base 914 and curve angularly (or tangentially), that is the bend in the leg 906 is in planes 907 tangential to a cylindrical projection 908 of the platform 910 defined to be coaxial with the adapter 900 versus radially inward. The bent legs 906 bias the platform 910 and pod 10 upwards compacting brewing material in the pod 10 to provide more effective brewing of material in the pod 10. The bent legs 906 are molded with the receptacle 902 as a single piece to reduce cost.

Figure 13:
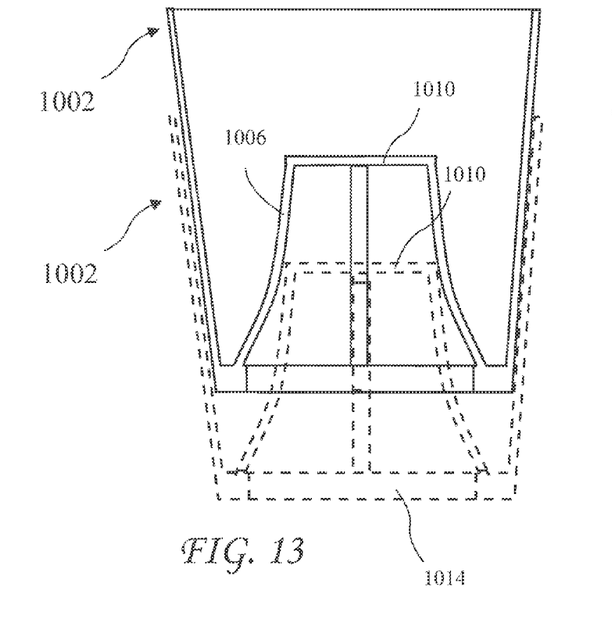
FIG. 13 is a cross-sectional view of nested disposable pod adapters according to the present invention of another preferred embodiment of the present invention facilitating packaging the disposable pod adapters.

A cross-sectional view of nested disposable pod adapter receptacles 1000 according to the present invention of another preferred embodiment of the present invention facilitating packaging the disposable pod adapters. The legs 1006 and platform 1010 are tapered upward and inward so that the disposable pod adapter receptacles 1002 may be nested for shipping. Such upward and inward tapering may be further incorporated into any disposable pod adapter receptacle to facilitate nesting.

Figure 14A:
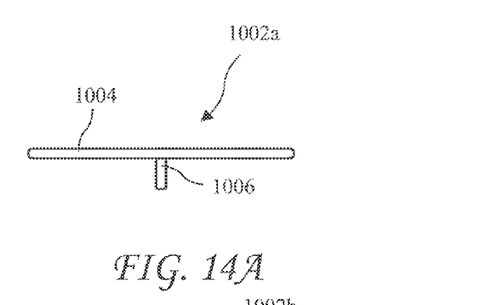
FIG. 14A is a first pedestal according to the present invention for use with the nested disposable pod adapters.
Figure 14B:
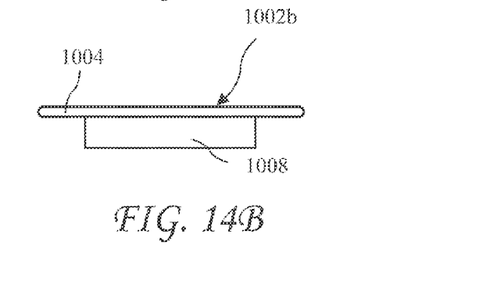
FIG. 14B is a second pedestal according to the present invention for use with the nested disposable pod adapters.

A first pedestal 1002a according to the present invention for use with the nested disposable pod adapter receptacle 1002 is shown in FIG. 14A and a second pedestal 1002b according to the present invention for use with the nested disposable pod adapter receptacle 1002 is shown in FIG. 14B. In some instances the platform 1010 may be reduced in size to the extent that the platform 1010 fails to effectively press the pod 10 upward against the cover 604. In these instances, either the pedestal 1002a or 1002b may be placed on top of the platform 1010 to provide a greater surface for pressing against the pod 10. The pedestal 1002a includes a post 1006 to engage a hole in the platform 1010, and the pedestal 1002b includes a mouth for circling the platform 1010.

Figure 15A:
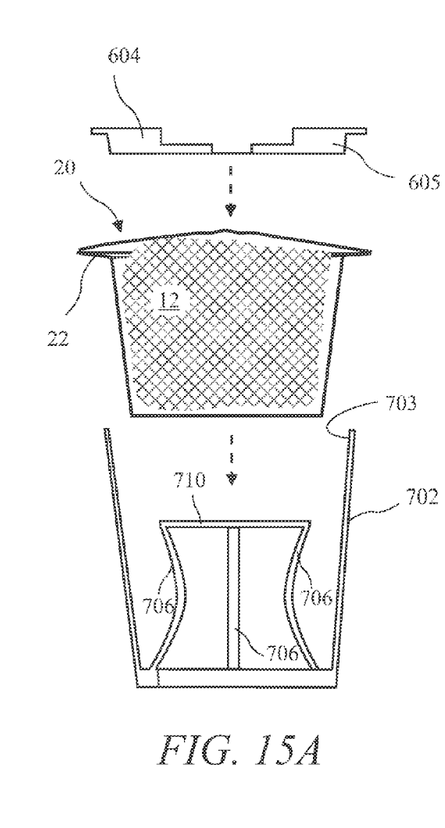
FIGS. 15A-15C shows steps for inserting a pre-packaged brewing pod into the disposable pod adapter and capturing a rim of the pre-packaged brewing pod between pod adapter receptacle and cover according to the present invention.
Figure 15B:
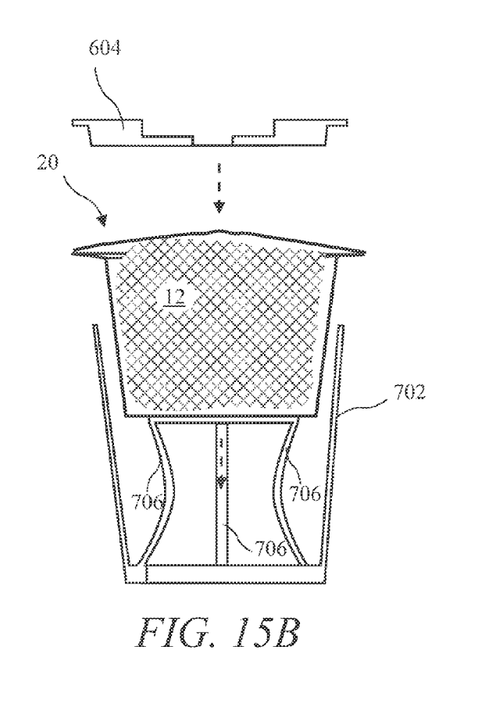
Figure 15C:
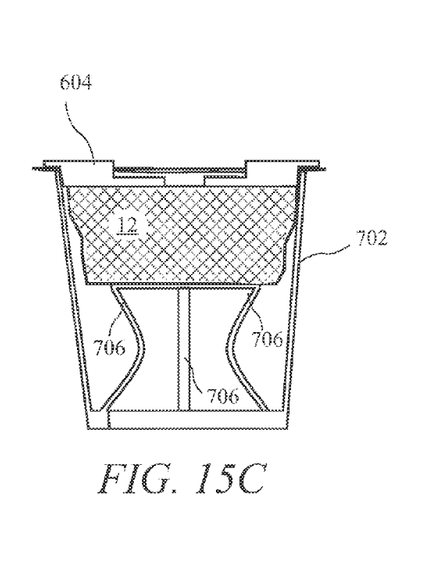
Figures 16A, 16B:
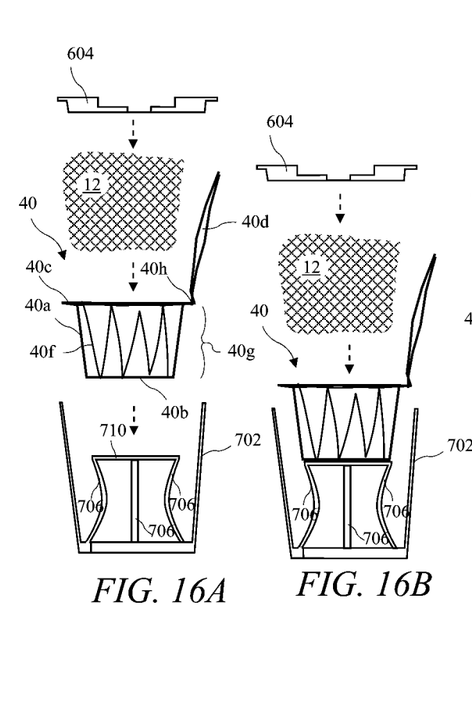
FIGS. 16A-16E shows steps for constructing a brewing pod using packaging with an attached cover in the disposable pod adapter according to the present invention.
Figure 16C:
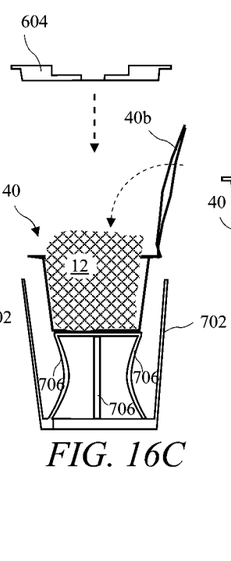
Figure 16D:
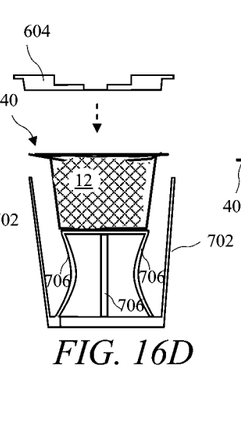
Figure 16E:
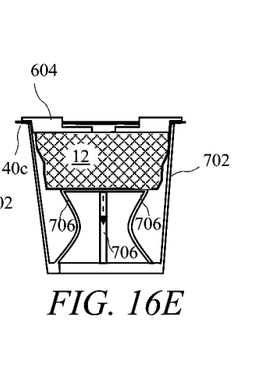
Figures 17A, 17B, 17C:
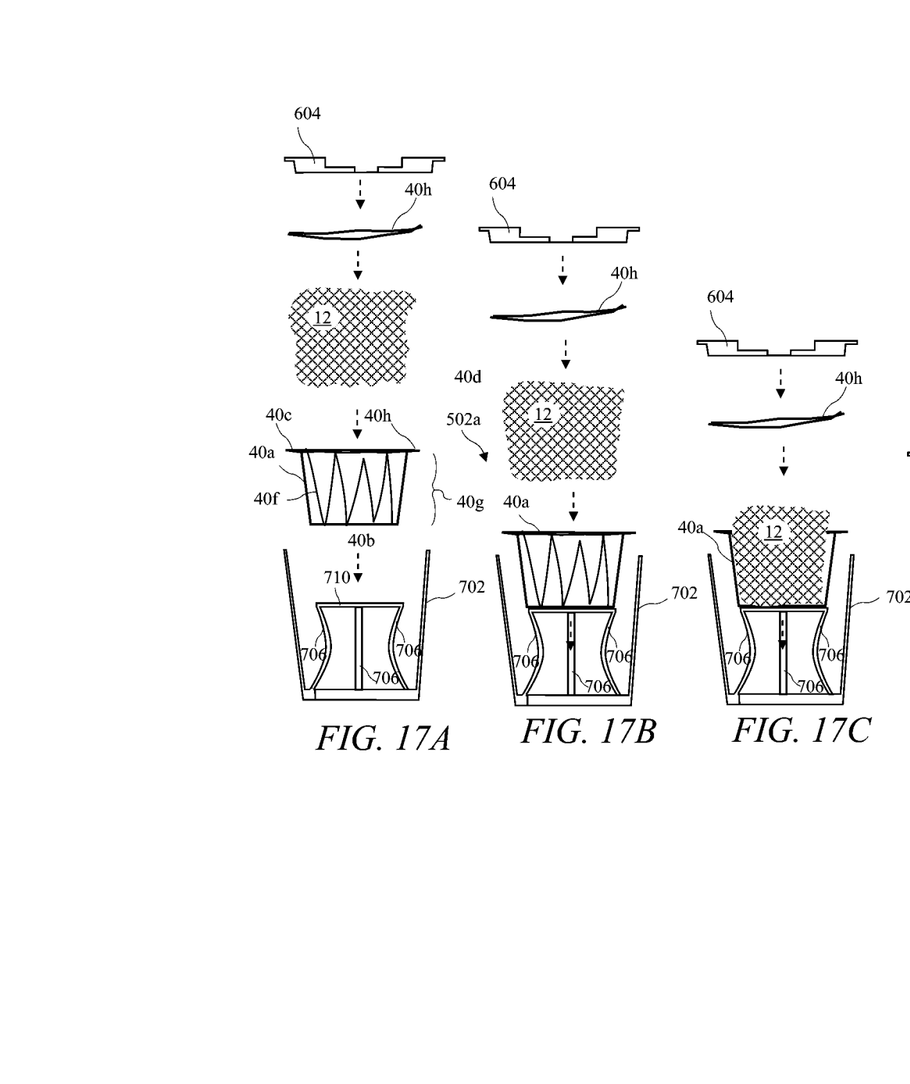
FIGS. 17A-17E shows steps for constructing a brewing pod using packaging with an detached cover in the disposable pod adapter according to the present invention.
Figures 17D, 17E:
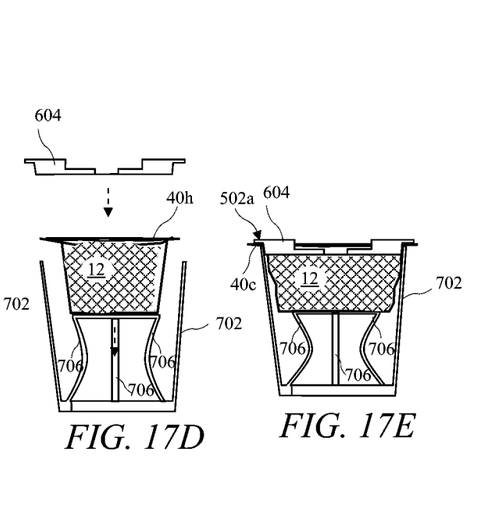

Steps for preparing the disposable pod adapter for use in a beverage brewer according to the present invention are shown in FIGS. 15A-15C. A pre-packaged brewing pod 20 is inserted into the disposable pod adapter 700 and a rim 22 of the pre-packaged brewing pod 20 is captured between pod adapter receptacle 702 and cover 604. Capturing the rim 22 holds the pre-packaged brewing pod 20 against the cover 604 to facilitate puncturing the pre-packaged brewing pod 20 by the needle 408 (see FIG. 4). The pre-packaged brewing pod 20 preferably comprises filter paper containing a brewing material. The filter paper may be formed in the same manner as the filter paper cup 40 described in FIG. 16A. The disposable pod adapter may then be inserted into a brewed beverage maker to make a cup of brewed beverage.

Steps for constructing a brewing pod using a filter paper cup 40 in the disposable pod adapter 702 according to the present invention are shown in FIGS. 16A-16E. The filter paper cup 40 includes a receptacle 40g formed from a bottom 40b, sides 40a, and a rim (or annular rim) 40c, and a cover (or lid) 40d for closing the receptacle 40g to capture brewing material in the filter paper cup 40. The filter paper cup 40 is preferably formed using heat and/or moisture to form permanent folds (or pleats) 40f in the sides 40a and rim 40c of the filter paper cup 40 to add strength and rigidity to the filter paper cup 40 so that the filter paper cup 40 somewhat retains its shape after forming to facilitate future use. Preferably, adhesive may be present in the rim 40c and/or the sides 40a to help retain the pleats 40f and add strength and rigidity to the filter paper cup 40. More preferably, the filter paper cup 40 is constructed from heat sealable filter paper having a heat reacting film on at least one side, which film causes the pleats to adhere to adjacent pleats when heat is applied following forming. The pleats in the rim 40c are generally continuations of the pleats in the sides 40a. The filter paper cup 40 may alternatively be corrugated to retain shape. The filter paper cup 40 thus has structure for maintaining a substantially (i.e., within the ability of the paper to maintain a shape) frustoconical or cylindrical shape unlike known beverage pods which have no structure for maintaining shape and are pillow-like. US Patent Application Serial No. 11/392,893 filed Mar. 28, 2006 filed by the present inventor, discloses a similar filter paper cup forming a beverage pod. The '893 application is incorporated by reference above.

The filter paper cup 40 is positioned inside the receptacle 702 and is filled with brewing material 12 and the cover 40b is folded over the brewing material 12 either before or after positioning the filter paper cup 40 in the receptacle 702. The cover 604 is pressed down over the closed filter paper cup 40 pushing the platform 710 down and causing the legs 706 to bend, and the rim 40c is partially or fully captured between the cover 604 and receptacle 702. The disposable pod adapter may then be inserted into a brewed beverage maker to make a cup of brewed beverage.

Steps according to the present invention for constructing a brewing pod using packaging with an detached cover 40h in the disposable pod adapter 700 are shown in FIGS. 17A-17E. The steps in FIGS. 17A-17E are identical to the steps in FIGS. 16A-16E, with the exception that the detached cover 40h is positioned over the brewing material versus being folded over the brewing material.

Figure 18A:
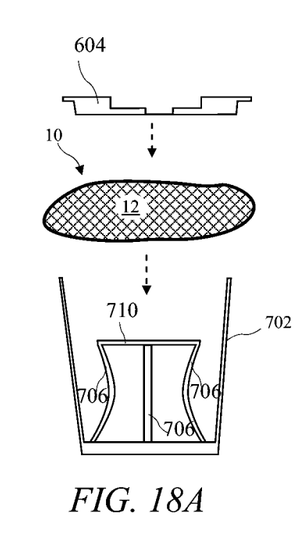
FIGS. 18A-18C shows steps for inserting a pre-packaged brewing pod into the disposable pod adapter according to the present invention.
Figure 18B:
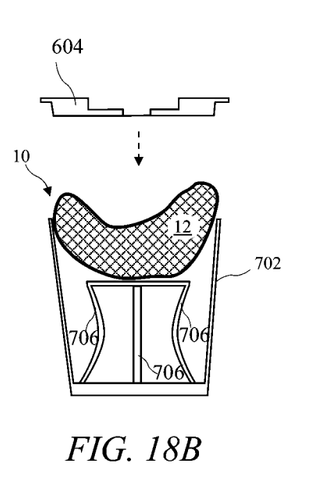
Figure 18C:
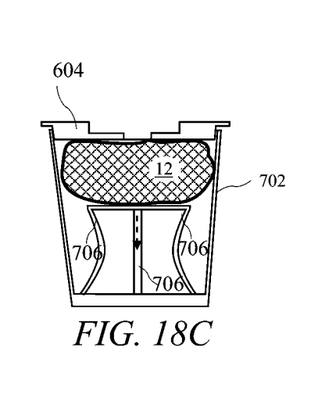

Steps for inserting the pre-packaged brewing pod 10 into the disposable pod adapter 700 according to the present invention are shown in FIGS. 18A-18C. The pod 10 is placed in the disposable pod adapter 700, and the cover 604 is pressed onto the receptacle 702.

The use of the disposable pod adapter has been described above using the receptacle 702, but the same use applies to all of the disposable pod adapters described above.

The unique concept of providing a biasing mechanism to press a beverage pod 10 against the hot water inlet in a pod brewer can be applied to a variety of different beverage brewing systems. Preferably, when the spring is fully compressed, the force applied to a pod 10 is preferably 1.5 lb. The pressure range being exerted against the pod 10 can preferably range between 0 to 1.5 lbs. Thus, for example a large pod 10 will have more pressure exerted on it than a smaller pod 10, because the spring is being compressed more. Moreover, the cross-section of the platform is preferably smaller than the diameter of the bottom so it can travel up and down the cup-shaped receptacle. In certain embodiments, the platform serves two functions by preventing the needle in certain single beverage brewers from perforating the pod 10 from the bottom and also pushing the pod 10 evenly against the hot water inlet so when brewing the beverage produced is consistent.

As described above, the pressure applied against the pod 10 by the biasing mechanism compacts the brewing material and serves the function of tamping the brewing material. Thus, less brewing material would be required to be packaged in a pod 10 to brew a cup of brewed beverage. It will be appreciated that the biasing mechanism can also be incorporated in any of the pod adaptor assemblies described herein. The pod adaptor assembly of the preferred embodiments can be made of a variety of different materials, including metal and plastics.

While the invention herein disclosed has been described by means of specific embodiments and applications thereof, numerous modifications and variations could be made thereto by those skilled in the art without departing from the scope of the invention set forth in the claims.

I claim:

1. An adapter comprising:
    a receptacle configured to receive a filter cup containing brewing material residing therein, said receptacle comprises sidewalls having a sidewall interior surface reaching up from a base having a base passageway;
    a biasing structure molded as a single piece with the receptacle, the biasing structure comprising:
        a single horizontal platform; and
        flexible legs attached to the base of the receptacle and reaching upwards inside the receptacle to the single horizontal platform, all of the flexible legs attached to the single horizontal platform to vertically support the single horizontal platform, the flexible legs providing resistance to downward movement of the single horizontal platform, and the flexible legs are bendable between a first relaxed position and a second depressed position to allow some downward movement of the single horizontal platform; and
    a cover adapted to engage with the receptacle, the cover detachable from the receptacle to allow insertion of the filter cup containing brewing material into the receptacle and the cover attachable to the receptacle after insertion of the filter cup containing brewing material into the receptacle to seal the receptacle before insertion of the filter cup containing brewing material adapter into a beverage brewer, the biasing structure configured be depressed downward upon containment of the filter paper cup containing brewing material by engagement of the cover with the receptacle, and to press the filter cup containing brewing material against the cover tamping the brewing material;
    the receptacle and cover attachable together solely by cooperating features of the receptacle and cover, and the attached receptacle and cover insertable into the beverage brewer and removable from the beverage brewer.

2. The adapter of claim 1, wherein the legs are bent legs.

3. The adapter of claim 2, wherein the legs bend radially.

4. The adapter of claim 2, wherein the legs are bent tangentially in planes tangential to a conceptual cylindrical projection of the platform defined to be coaxial with the adapter.

5. The adapter of claim 1, wherein the legs have a spiral shape.

6. The adapter of claim 5, wherein the legs comprise four legs.

7. The adapter of claim 1, wherein:
    the cover includes a downward reaching cylindrical portion and the receptacle includes a lip defined by the sidewall interior surface; and
    the cover is detachably attachable to the receptacle by an interference fit between the cylindrical portion and the lip.

8. An adapter comprising:
    a receptacle configured to receive brewing material contained in filter material, said receptacle comprises:
        sidewalls defining a receptacle interior and receptacle exterior,
        a top edge of the sidewall;
        a base at the bottom of the sidewalls; and
        a receptacle passageway placing the receptacle interior in fluid communication with the receptacle exterior;
    a single horizontal platform inside the receptacle and configured to support brewing material residing in the receptacle;
    flexible legs attached to the base of the receptacle and reaching upwards inside the receptacle to support the horizontal platform, the flexible legs bending to provide resistance to downward movement of the platform;
    a cover adapted to sealing engage with the top edge of the receptacle, the cover detachable from the receptacle to allow insertion of the brewing material into the receptacle and the cover attachable to the receptacle after insertion of the brewing material to seal the receptacle before insertion of the adapter into a beverage brewer;
    upon containment of the filter paper cup containing brewing material in the receptacle by engagement of the cover with the receptacle, the single horizontal platform is depressed downward, bending the flexible legs, and holding the filter cup containing brewing material between the single horizontal platform and the cover, thereby tamping the brewing material; and
    cooperating features of the receptacle and cover providing the sole means of attaching the cover to the receptacle,
    wherein, the attached receptacle and cover, the receptacle containing the brewing material, are engagable with the beverage brewer and disengagable from the beverage brewer, and the flexible legs and the single horizontal platform are molded as a single piece with the receptacle.

9. The adapter of claim 8, wherein the flexible legs comprise bent legs.

10. The adapter of claim 9, wherein the bent legs bend radially.

11. The adapter of claim 9, wherein the flexible legs are bent legs bending tangentially in planes tangential to a conceptual cylindrical projection of the platform defined to be coaxial with the adapter.

12. The adapter of claim 8, wherein the flexible legs having a spiral shape.

13. The adapter of claim 12, wherein the flexible legs comprise four legs.

* * * * *